United States Patent [19]

Butz

[11] 4,271,963
[45] Jun. 9, 1981

[54] DISK PACK HANDLE MECHANISM

[75] Inventor: David E. Butz, Littleton, Mass.

[73] Assignee: Data Packaging Corporation, Cambridge, Mass.

[21] Appl. No.: 46,636

[22] Filed: Jun. 8, 1979

[51] Int. Cl.³ .......................................... B65D 85/02
[52] U.S. Cl. ..................................... 206/444; 206/405
[58] Field of Search ............... 206/444, 405, 406, 404, 206/1.5

[56] References Cited

U.S. PATENT DOCUMENTS

| 3,004,658 | 10/1961 | Rehklau | 206/406 |
| 3,297,154 | 1/1967 | Lyman | 206/405 |
| 3,509,992 | 3/1970 | David et al. | 206/444 |
| 3,862,555 | 1/1975 | Wirth | 206/1.5 |
| 3,882,701 | 5/1975 | Wirth | 206/444 |
| 3,926,312 | 12/1975 | Elliott et al. | 206/444 |
| 4,071,862 | 1/1978 | Lathrop et al. | 206/444 |

Primary Examiner—Joseph Man-Fu Moy
Attorney, Agent, or Firm—Wolf, Greenfield & Sacks

[57] ABSTRACT

A disk pack top cover assembly wherein the top cover has a well provided with a hole in the center of the bottom wall. A handle is rotatably mounted in the well and carries a tool body assembly that extends through the hole. The tool body includes a collar molded as an integral part of the handle and a tool body stamping that forms a cap over the lower end of the collar.

8 Claims, 6 Drawing Figures

DISK PACK HANDLE MECHANISM

INTRODUCTION

This invention relates to disk packs and more particularly comprises a new and improved disk pack top cover assembly.

The present invention is specifically designed to replace more expensive and much more complicated disk pack top cover assemblies found in the prior art. The prior art assemblies include approximately 18 parts, some of which are machined stainless steel that are very costly. The number of parts and the manner in which the parts connect together make the assembling operation itself quite costly. The principal object of the present invention is to provide a disk pack top cover assembly capable of performing all of the functions of the prior art but which may be manufactured at substantially less cost.

A more specific object of the present invention is to provide a disk pack top cover assembly which has a greatly reduced number of parts as compared with the prior art and which may be assembled quickly and easily without special tools, jigs, etc.

Another specific object of this invention is to provide a disk pack top cover assembly substantially less expensive than the prior art products but which nevertheless performs all of the necessary functions as the prior art devices and with equal facility.

Yet another specific object of the present invention is to reduce the weight of the disk pack top cover assembly.

To accomplish these and other objects, the handle of the disk pack top cover assembly of the present invention is made up of a total of five parts as opposed to the 18 parts found in the prior art device. The changes made in the prior art to achieve the present invention are generally confined to the tool body assembly, and no change is required in the tools used to manufacture the top cover on which the tool body assembly and handle are mounted. The handle in accordance with the present invention is provided with a collar that forms the tool body base. The end of the collar is capped by a tool body stamping made of stainless steel or other like material having comparable strength and wearability. The stamping provides the shoulder on the inside of the collar which cooperates with the locking bearings on the spindle carried by the bottom cover of the disk pack, to releasably lock the disk pack in the closed condition, and the end face of the tool body cap is provided with a number of pins which cooperate with the spindle to screw the spindle onto the drive of the deck on which the disk pack is used. A snap washer supports the handle in rotatable engagement on the cover.

These and other objects and features of this invention will be better understood and appreciated from the following detailed description of one embodiment thereof, selected for purposes of illustration and shown in the accompanying drawing.

BRIEF FIGURE DESCRIPTION

DETAILED DESCRIPTION

Figure 1:
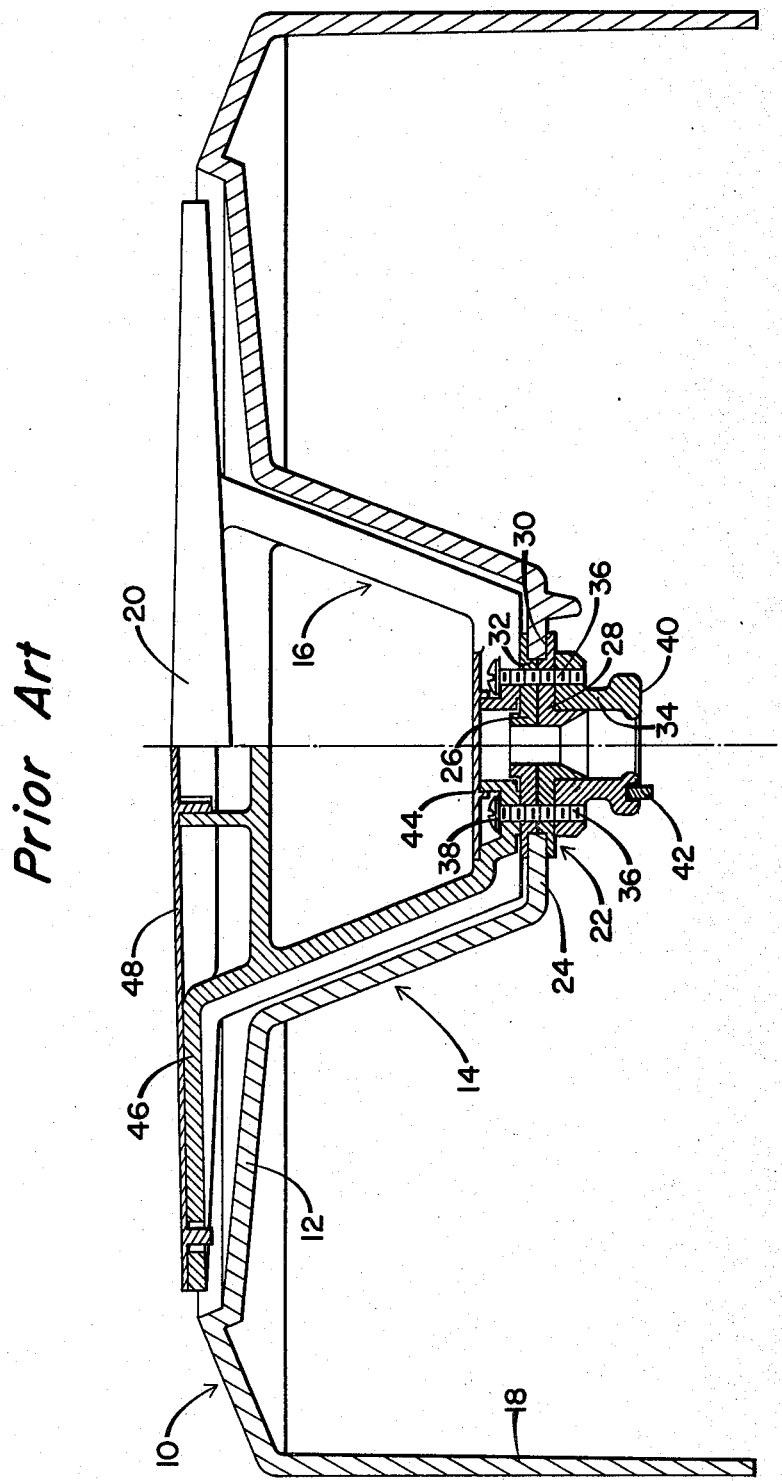
FIG. 1 is a cross sectional view of a prior art disk pack top cover assembly.

In FIG. 1 a prior art disk pack top cover assembly is shown, which has been very widely used in the industry. The assembly includes a cover 10 having a top wall 12 with a well 14 formed in its center that supports the handle 16. The cover has a peripheral wall 18 that is designed to engage the bottom cover (not shown) of a disk pack when the pack is closed. The top cover 10 does not rotate with respect to the bottom cover; a seal is formed between them to protect the disks (not shown) within the pack.

The handle 16 of the prior art includes a grip portion 20 and a tool body subassembly 22. The subassembly 22 extends beneath the bottom wall 24 of the cover well 14 and is designed to cooperate with a spindle (not shown) on the bottom cover of the disk pack to both releasably lock the pack in closed condition and to rotate the spindle so as to screw it onto the drive of the deck of the electronic equipment on which the disk pack is used. The tool body subassembly 22 includes a pair of slip washers 26 and 28 that sandwich the periphery 30 of the opening 32 formed in the bottom wall 24 of well 14 so as to support the handle and tool body in place on cover 10. A tool body collar 34 machined of stainless steel also forms part of the subassembly 22. The two slip washers and the tool body collar are held in place on the handle 16 by four screws 36, two of which are shown in FIG. 1. Each of the screws in turn carries a spring washer 38 beneath its head. Provided in the bottom end 40 of the tool body collar 34 are three pins 42 (one of which is shown), designed to engage holes in the spindle (not shown) to rotate the spindle when the handle is turned to screw the spindle onto the drive. The assembly of the prior art is completed by a cap 44 secured to the handle by a strip of double-stick tape so as to cover the screws 36. And the handle itself may be made of two pieces, namely, a main body portion 46 and a cap insert 48. It will be appreciated from the foregoing description of the prior art that the device is costly to manufacture because of the number of different molded and machined parts, as well as the complexity of assembly. In accordance with the present invention both the number and cost of the parts as well as the complexity of assembly have been greatly reduced.

Figure 2:
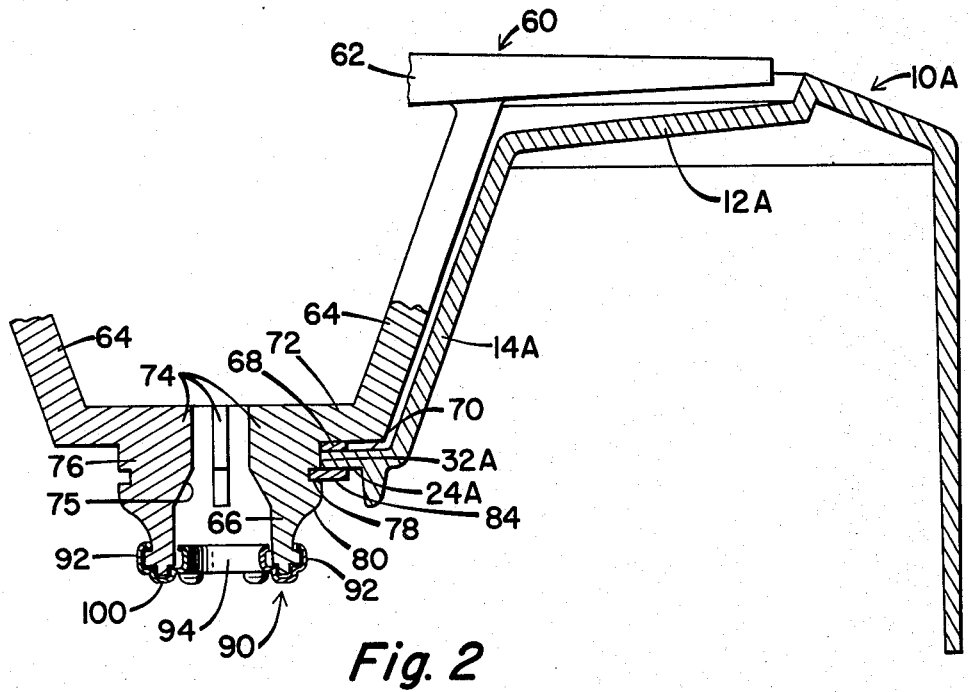
FIG. 2 is a cross sectional view of a disk pack top cover assembly constructed in accordance with the present invention.

In FIG. 2, the present invention is shown. It includes a cover 10A virtually identical to the cover 10 of the prior art. Thus, the cover 10A includes a top wall 12A, well 14A, bottom well wall 24A, and opening 32A in the bottom wall through which the tool body subassembly of the handle extends. Handle 60 has a gripping bar 62, legs 64 within the well 14A and a cylindrical collar 66 that extends through opening 32A in the bottom wall 24A of the top cover. A slip washer 68 rests on the upper surface 70 of the bottom wall 24A, which in turn supports the lower surface of bottom wall 72 of the handle.

Figure 5:
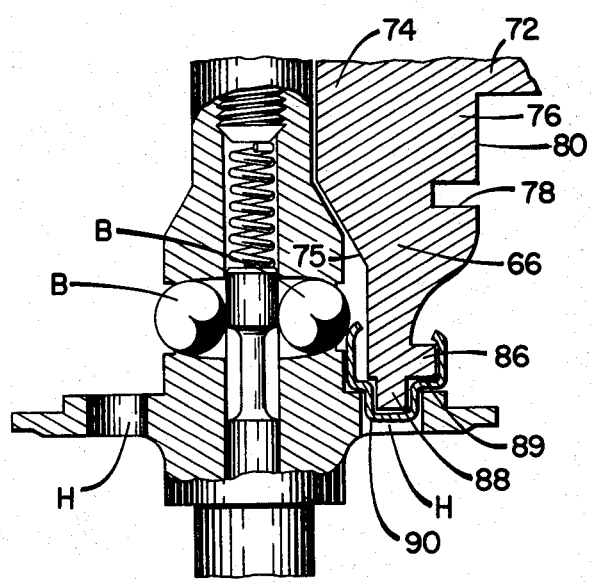
FIG. 5 is a fragmentary cross sectional view of the tool body assembly and suggesting the manner in which it cooperates with the spindle.

Collar 66 is of uniform thickness and includes four inwardly extending ribs 74 at its top which serve as a pilot for centering the spindle on the bottom cover disposed in the tool body as shown in FIG. 5. For this purpose the lower ends of ribs 74 are bevelled as shown at 75. The collar 66 also has four radial ribs 76 on its outer surface to strengthen the assembly and center the collar in the hole 32A. Each of the ribs 76 include a groove 78 in its edge 80. The small grooves 78 are provided to receive a snap washer 84 that retains the handle assembly in place on the bottom wall 24A of well 14A. It will be noted in FIG. 2 that the lower wall 72 of the handle and the snap washer 84 sandwich the periphery of opening 32A to retain the parts in the assembled relationship.

Figure 3:
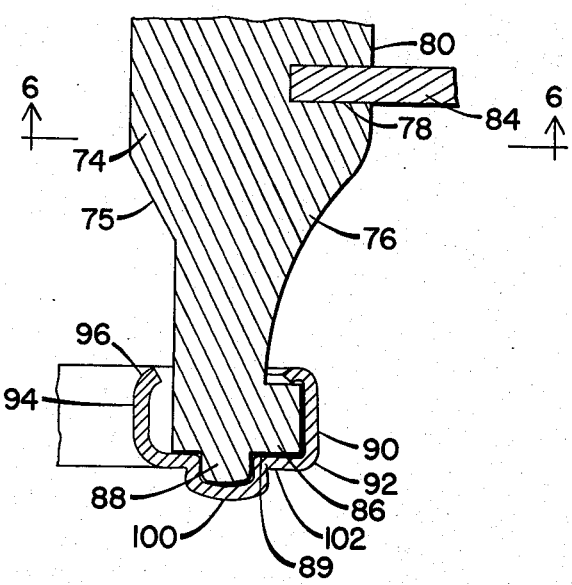
FIG. 3 is an enlarged fragmentary cross sectional view of the tool body subassembly of the disk pack top cover assembly shown in FIG. 2.
Figure 4:
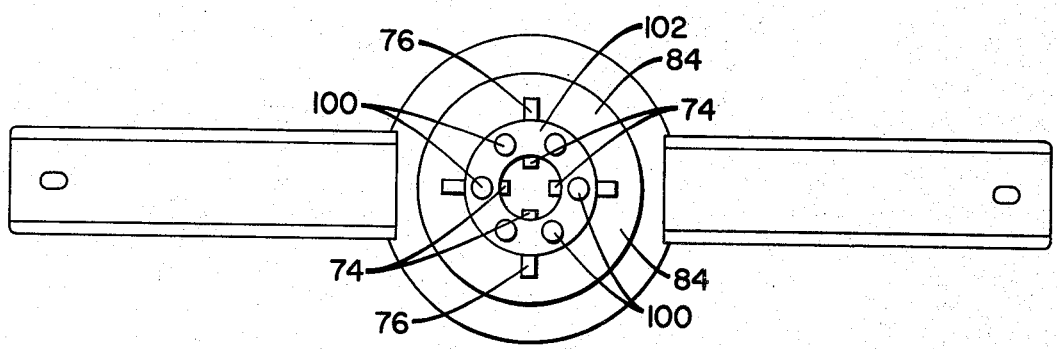
FIG. 4 is a bottom plan view of the tool body shown in FIG. 3.
Figure 6:
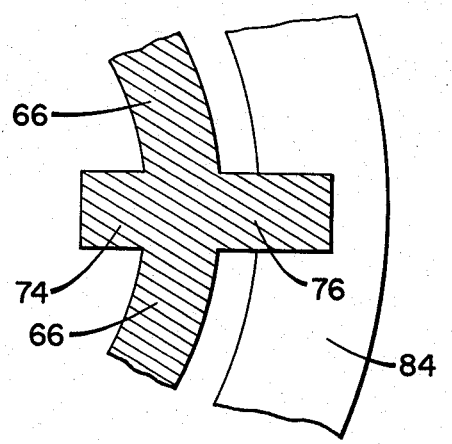
FIG. 6 is a cross-sectional view taken along section line 6—6 of FIG. 3.

The lower end of the collar 66 has an outwardly extending annular flange 86, and a plurality of pins 88 on the lower end of the collar extend in an axial direction from the collar face 89. The lower end of collar 66 is capped by the tool body stamping 90 as is clearly shown in FIG. 3. The stamping 90 is made of stainless steel and is generally U-shaped in cross section. The outer arm 92 is rolled or crimped over flange 86 after it is assembled, to retain the stamping in place. The inner arm 94 is spaced slightly from the inner cylindrical surface of the collar, and its upper end is turned inwardly as suggested at 96 to form a shoulder to engage the locking bearings B carried by the spindles on the bottom cover (not shown) of the disk pack, as illustrated in FIG. 5.

In the form shown the stamping 90 includes 6 axially extending cups or pins 100 formed in the bottom wall 102, which are provied with a slight radius at their lower ends so as to provide a lead-in to achieve registration with the holes H provided in the spindle so that the handle may rotate the spindle so as to screw it onto the drive of the deck (not shown) on which the disk pack is mounted. Each of the cups 100 receives a pin 88 molded as an integral part of collar 66. The pins 88 insure that the stamping will not turn on the collar but rather will remain in fixed relationship with it when the handle is rotated.

The foregoing description makes clear the numerous advantages of the present invention over the prior art illustrated in FIG. 1. Most striking is the great reduction in the number of separate pieces which make up the assembly. In the prior art, 18 pieces are utilized, while in the present invention there are but five pieces. And the expensive stainless steel machined collar of the prior art has been replaced by a much less expensive stainless steel stamping. And the four holes for the screws and the precision holes for the pins 42 have been eliminated. Furthermore, the special pieces required to mold the top recess in the handle for the screw heads has been eliminatd. And the weight of the assembly has been reduced from 237 grams to 114 grams. In addition, six pins are provided in the tool body to engage the holes in the spindle, rather than the three pins provided in the prior art.

And the assembling of the cover assembly of this invention is very simple. In accordance with the present invention the assembly is put together merely by inverting the handle, dropping the slip washer 68 on the collar 66, placing the cover 10A over the collar and on the washer and mounting the snap washer 84 in the grooves 78. The stamping of course may be mounted on the collar and crimped or spun over the flange 86 before the other parts are assembled.

Finally, in the present invention all thick sections in the plastic parts of the tool body have been eliminated and the ribs and cylindrical wall on the collar are all of the same thickness. Consequently, the cycle time is minimized in the molding process, the cost of material is held to a minimum, and shrinkage marks are reduced.

From the foregoing those skilled in the art will appreciate that all of the objects of the present invention are realized. And modifications may be made of the invention illustrated without departing from the spirit of the invention. Therefore it is not intended that the scope of the invention be limited to the single embodiment illustrated and described. Rather, the scope is to be determined by the appended claims and their equivalents.

What is claimed is:

1. A disk pack top cover assembly comprising:
 a top cover with a well provided in its center for receiving a rotatable handle, said well including a bottom wall and a peripheral side wall,
 a handle disposed in the well and having a gripping bar disposed adjacent the top of the well,
 a circular opening in the well bottom and an annular collar formed as an integral part of the handle and extending through the opening,
 a shoulder formed on the handle above the collar to support the handle on the upper surface of the bottom wall of the well,
 a cap over the lower end of the collar and extending upwardly on both the inside and outside of the collar,
 an upwardly facing shoulder formed on the portion of the cap extending into the collar for engaging the locking bearings of a spindle on the disk pack bottom cover,
 a plurality of axially extending pins formed on the lower end of the cap for engaging the spindle of the bottom cover so that rotation of the handle will turn the spindle to enable it to be screwed onto the disk pack drive,
 and a washer engaging the collar and bearing against the bottom surface of the well bottom wall to retain the handle in place on the cover.

2. A disk pack top cover assembly comprising:
 a top cover having a hole provided in its center to receive a handle,
 a molded plastic handle mounted for rotation on the cover and having an annular collar formed as an integral part thereof and which extends through the hole in the cover,
 means on the collar for retaining the handle on the cover,
 a tool body cap connected to the lower end of the collar which extends through the hole in the cover, said cap extending upwardly on the inner and outer surfaces of the collar,
 a flange on the end of the collar and said cap being bent over the flange to retain the cap in place,
 and a shoulder formed on the upper end of the cap within the collar forming part of the cover locking means.

3. A disk pack top cover as defined in claim 2 further characterized by
 said cap being a metal stamping with the upper edge of the cap outside the collar being bent over the flange.

4. A disk pack top cover as defined in claim 2 further characterized by a plurality of axially extending pins formed as an integral part of the collar and spaced uniformly about the bottom end thereof, and a plurality of pockets formed as an integral part of the cap and receiving the pins on the collar.

5. A disk pack top cover as defined in claim 4 further characterized by said cap being a stainless steel stamping, and said pockets being closed at the bottom with the lower surfaces thereof having a radius for providing a lead in to enable the pockets to be inserted into holes in the spindle on the bottom cover with which the cover assembly mates.

6. A disk pack top cover as defined in claim 2 further characterized by said collar having an annular wall of substantially uniform thickness, and a plurality of ribs inside the collar for centering a spindle inserted in it.

7. A disk pack top cover as defined in claim 6 further characterized by a plurality of additional radial ribs on the outer surface of the collar, and a washer secured to the additional ribs and engaging the periphery of the hole in the cover to retain the handle on the cover.

8. A disk pack top cover as defined in claim 7 further characterized by the collar and ribs all being of substantially the same thickness.

* * * * *